Patented Aug. 6, 1929.

1,723,174

UNITED STATES PATENT OFFICE.

JOSEPH A. JEFFERY AND FRANK H. RIDDLE, OF DETROIT, MICHIGAN, ASSIGNORS TO CHAMPION PORCELAIN COMPANY, OF DETROIT, MICHIGAN, A CORPORATION OF MICHIGAN.

USE OF DUMORTIERITE.

No Drawing.   Application filed March 26, 1927.   Serial No. 178,810.

This invention relates to ceramic materials. The object of the invention is to provide a batch for ceramic materials capable of producing a desired ceramic body under favorable firing conditions, and to produce ceramic articles having desirable characteristics.

More particularly, this invention relates to the use of mineral dumortierite in the manufacture of ceramic materials, and specifically to its use in manufacturing articles. The mineral dumortierite is a definite crystalline material described in Danas System of Minerology, sixth edition, page 558, and in other authorities on minerology. Although the material may be definitely recognized by its optical and other properties, the chemical composition is not absolutely certain. It appears to approximate the formula of 8 molecules of alumina, 1 of borax, 1 of water and 6 of silica. It is frequently found with various impurities intimately mixed therewith, muscovite mica being a common impurity.

It has been discovered that dumortierite has the following characteristics, amongst others, particularly fitting it for certain uses in the manufacture of ceramics. One of the most marked characteristics of dumortierite, fitting it for use in batches for ceramic bodies, is the fact that this mineral is transformed into so-called artificial sillimanite, or mullite, at a comparatively low temperature, that is, at a lower temperature than cyanite or andalusite. The transformation of dumortierite to mullite has been found complete after heating to about cone 6, and begins at a still lower temperature.

This makes possible the use of dumortierite in ceramics which are fired at a comparatively low temperature, and its transformation into mullite at this low temperature, thereby producing in these low fired articles the desirable mullite crystals. It is an important advantage to be able to fire ceramic ware at a sufficiently low temperature so that clay saggers may be used to support the ware during firing. With the previously known materials, it has been considered necessary to fire the ware to such a high temperature, in order to produce mullite, that saggers more refractory than the usual clay saggers were necessary, and special kilns as well as kiln furniture had to be provided.

Furthermore, transformation of dumortierite into mullite is comparatively gradual, and the growth of mullite crystals is slow, so that it does not have a tendency to disrupt the body being fired at any particular temperature, as is sometimes the case with cyanite. The curves both for change in volume and for absorption of heat are comparatively regular for dumortierite.

A batch containing dumortierite and suitable for making a whiteware body may be made up as follows: Dumortierite, 30 parts, feldspar, 10 parts, ball clay, 15 parts, and English china clay, 45 parts. Such a batch burned to cone 8 will produce a body suitable for white ware.

A batch containing dumortierite and suitable for making hotel china, maturing at about cone 11, may be made as follows: Dumortierite, 40 parts, feldspar, 13 parts, whiting, 2 parts, ball clay, 15 parts, and English china clay, 30 parts.

The same or similar materials may be suitably proportioned to form a batch for high tension insulators maturing at from cone 10 to cone 12.

Other mixtures may be made containing dumortierite and suitable for firing at cone 12 or below, the above being given as examples of batches which give good results. A characteristic of dumortierite which is important in making white ware, hotel china and the like, is that, not only does the pure dumortierite burn to a good white color, but the usual impurities present in the mineral, and which color the raw mineral various hues, do not seem to affect the color of the fired product, so that the mineral with the natural impurities usually found therein burns to a good white color.

Another marked characteristic of bodies containing dumortierite is, that they develop a very good glaze, when given the usual treatment for glazing. Bodies containing dumortierite develop a better glaze than do bodies containing andalusite or cyanite, other things being equal.

Whenever the batch contains a material amount of clay or other aluminous and siliceous materials which are not transformed into mullite until heated above cone 12, a stronger article can be made by firing until substantially the maximum amount of mullite has been formed from the batch, but this high firing is not necessary in order to reap some benefit from the presence of dumortierite.

A desirable feature of the mineral, when used in batches which are fired to as high a temperature as cone 17, for example, is that its boron content does not appear to volatilize to any material extent when heated that high. The raw batches for ceramic ware have been carefully analyzed for boron, the material thereafter fired up to cone 17, and the fired ware analyzed for boron content, without disclosing any measurable loss of boron.

Boron is a desirable constituent of ceramic ware for several reasons, but ordinarily the loss by volatilization is considerable at a temperature even lower than cone 17, so that the retension of the baron in the compound formed from dumortierite mineral is a desirable characteristic.

In the manufacture of spark plugs it is necessary to provide a composition which will have a high hot dielectric. Fluxes containing alkaline earth metals have been found to form bodies having a higher hot dielectric than bodies containing feldspar and other common alkali fluxes. However, the use of alkali earth metal fluxes is attended with the difficulty that the bodies have a comparatively narrow firing range. That is, the bodies melt to such an extent that they are deformed at a temprature but little above that at which they are fused sufficiently to form a satisfactory porcelain body. Flux introduced as feldspar increases the firing range, or the temperature difference between the point where vitrifaction takes place and where fusion resulting in deformation occurs, but reduces the hot dielectric.

When the mineral dumortierite is added to the usual spark plug body it is found that the firing range is increased, while the hot dielectric is also raised. The mineral is, therefore, a very valuable ingredient in spark plugs for this reason. The dumortierite which has been used contains muscovite mica intimately mixed therewith and evenly distributed throughout the mass, but the alkali metal in this impurity has not injuriously affected the hot dielectric.

Desirable mixtures for forming spark plugs may be given as follows by way of example:

| Formula | A | B | C |
|---|---|---|---|
| Dumortierite | 60 | 29 | 14½ |
| Andalusite |  | 37 | 55 |
| Talc |  | 1.75 | 1.75 |
| Calcium carbonate | 5 | 1 | 1 |
| Harris clay |  | 1 |  |
| Ball clay | 5 | 7 | 7.05 |
| Edgars Florida kaolin | 10 | 6.25 | 6.6 |
|  | 20 | 18 | 14.1 |

Each of the mixtures given above makes good spark plug bodies, indicating that dumortierite may be used for substantially all of the non-plastic portion of the body, as in mixture A, or may be used in a comparatively small amount, as given in mixture C, and still impart valuable characteristics to the composition. Possible combinations of materials for spark plug porcelains containing dumortierite might be multiplied indefinitely, but the above are given as examples of batches which have proved satisfactory.

Dumortierite is also suitable for forming refractory bodies such as fire brick, furnace linings, etc. The minearal, particularly that containing the mica as described above, has the desirable characteristic, that, when ground, it may be cast and shaped without the addition of other material, so that highly refractory articles may be made therefrom without the addition of other materials, if desired. For most purposes the addition of other materials to suit the particular exigencies of the intended use is preferable, but because of the aforementioned characteristic of the ground minearal, any desired portion may be used up to 100% in the production of ceramic bodies.

In the production of furnace linings and similar refractory materials, dumortierite may be applied in the furnace after having been fired at a low temperature, or it may be applied in the raw state and thereafter heated in position. The fact that the mineral does not materially alter in bulk, when fired, makes it particulary suitable for the last mentioned method of use. It is also suitable for use as a mortar in which to lay fire brick, when it is not desired to use this material for the entire structure.

A refractory block containing dumortierite has been found particularly desirable for the arch of glass tanks and for similar uses where it is subjected to hot fumes, as it is remarkably resistant to heated fumes, particularly to the volatilized fluxes and other heated fumes in a glass tank. Very satisfactory blocks for glass-tank arches have been made from a batch containing 70 parts of dumortierite and 30 parts ordinary glass-tank clay.

Dumortierite swells slightly when it is transformed into mullite. This seems to be negligible in the formation of spark plug bodies and similar small articles, but when kiln blocks, or other comparatively large articles, are formed, it is sometimes desirable to avoid this expansion of the dumortierite by pre-firing the mineral sufficiently to transform it into mullite. The mineral may be fired before grinding, as it is crushed more easily after firing. This pre-firing can be done readily and inexpensively, because of the low temperature at which the dumortierite is transformed.

Where the slight change in volume of the dumortierite, when it is transformed, does not affect the product adversely, it is preferable to introduce the ground mineral into the batch without pre-firing. This saves one firing operation, and the state of the mineral, when it is being transformed into mullite, is favorable to intimate union with the other ingredients of the batch. When the batch containing dumortierite is used for a mortar, or for similar purposes, the slight swelling that occurs when the dumortierite is transformed aids in producing a tight bond.

While some examples have been given of the particular uses which may be made of the mineral dumortierite to take advantage of its peculiar properties which have been set forth above, it will be understood that many variations may be made in the quantities and kinds of material mixed therewith in accordance with the particular purposes to be accomplished, while still taking advantage of the properties mentioned above, and coming within the terms of the broader of the subjoined claims. While the broader claims read upon the various batches given above and upon other batches the formation of which is obvious in view of the facts stated above, the specific batch upon which all claims in this application are intended to read is that given for hotel china. Other specific uses are to be claimed in divisional applications.

The widening of the firing range, mentioned in connection with the use of dumortierite in spark plug bodies, also results from its use in other bodies where the firing range, without the dumortierite, is objectionably narrow, so that the use of dumortierite for widening the firing range is not confined to spark plug bodies.

What we claim is:

1. A batch for a ceramic material, comprising dumortierite.
2. A batch for a ceramic material, containing dumortierite and its natural impurities.
3. A batch for a ceramic material, containing dumortierite and the muscovite mica present in the dumortierite mineral.
4. A batch for a porcelain article, containing dumortierite.
5. A batch for a porcelain article, containing dumortierite and other materials having a maturing point as low as cone 12.
6. A batch for a porcelain article, containing dumortierite, clay and a flux and having a maturing point as low as cone 12.
7. A batch for a porcelain article, containing dumortierite, clay and feldspar and having a maturing point below cone 12.
8. A batch for ceramic material, comprising raw ground dumortierite.
9. A ceramic product made from a batch containing dumortierite.
10. A porcelain article made from a batch containing raw dumortierite.
11. A porcelain article made by firing, to a temperature between cones 8 and 12, a batch containing raw dumortierite.
12. The method which consists in forming a batch containing dumortierite and firing it to a temperature above cone 6.
13. The method which consists in mixing raw ground dumortierite, feldspar and clay and firing the mixture to a temperature between cone 8 and cone 12.

In testimony whereof we have hereunto signed our names to this specification.

JOSEPH A. JEFFERY.
FRANK H. RIDDLE.